April 21, 1970  V. A. OBUKHOV  3,508,093

DUCTED STATOR FOR ELECTRICAL MACHINES

Filed Dec. 9, 1968

United States Patent Office 3,508,093
Patented Apr. 21, 1970

3,508,093
DUCTED STATOR FOR ELECTRICAL MACHINES
Vitaly Arsenievich Obukhov, Ulitsa Suvorova 34, kv. 15,
Lysva, Permskoi oblasti, U.S.S.R.
Filed Dec. 9, 1968, Ser. No. 782,228
Int. Cl. H02k 1/20
U.S. Cl. 310—65          2 Claims

ABSTRACT OF THE DISCLOSURE

A stator core made of a stack of laminations and provided with radial ventilating ducts is arranged to have a constant flow-passage area due to the use of supplemental laminations employed in the yoke region of the core as distinguished from the toothed or teeth region.

---

The present invention relates to stators for electrical machines, and more particularly to stators for electrical machines having ventilation systems including radial ventilating ducts.

Known in the art are electrical machines with radial ventilating ducts which have ventilating ducts constructed with ventilation spacers introduced between stacks of iron laminations constituting the stators.

In these electrical machines of the prior art, the thickness of the stack of iron laminations of the stator is constant throughout the stator. Consequently, in such stators, with the winding turns placed therein, the cooling air, while passing from the zone of the teeth or poles to the zone of the yoke, passes through a zone where the cross-sectional area of the ventilating duct increases sharply, whereby the speed of the air current decreases, which results in poorer cooling of the stator surfaces.

An object of the present invention is to eliminate these disadvantages. With this and other objects in view, the present invention provides a stator for an electrical machine, which has radial ventilating ducts of substantially constant cross-sectional flow-passage area throughout their length.

This is accomplished by providing a stator for an electrical machine in which, in accordance with the present invention, the radial ventilating ducts have a greater thickness, measured in the axial direction of the machine, in the zone or area of the teeth than in the zone or area of the yoke of the stator core, whereby, with the winding turns placed in the grooves of the core, the cross-sectional flow-passage area of said ducts is substantially equalized throughout the whole length of the ducts.

According to the characteristic feature of the present invention, an equalized cross-sectional flow-passage area of the radial ventilating ducts throughout their length is insured by introducing additional iron segments into the stacks of iron laminations of the stator core in the yoke area of the core. As a result, a stator constructed in accordance with the present invention offers an advantage arising from the fact that the speed of the current of the cooling fluid, viz. air, is increased in the area of the yoke of the stator core, which improves the conditions of the heat transfer between the stator iron and the cooling fluid.

Besides that, the introduction of the additional iron segments increases the effective length of the stator iron in the area of the yoke. Thus, in an electrical machine of a given capacity, embodying the present invention, the external diameter of the machine can be reduced, whereas the cross-sectional area of the stator core yoke can be kept the same, as in the machines of the same capacity of the prior art or, alternatively, the length of the machine can be reduced, while the external diameter of the machine can be the same, as in the machines of the same capacity of the prior art.

The present invention can be better understood from the following detailed description of an embodiment thereof, due reference being had to the accompanying drawings, in which.

Figure 1:
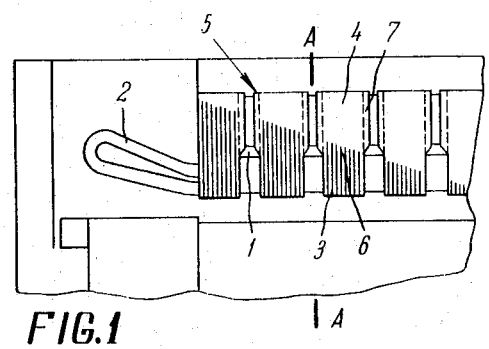
FIG. 1 is a longitudinal sectional view of the stator of an electrical machine, in which the thickness of the stacks of iron laminations varies from the area of the yoke to the area of the teeth, or poles, according to the present invention.

Referring now to the drawings, the passage section of a ventilating radial duct 1 (FIG. 1) should be substantially uniform, when the winding turns 2 (FIGS. 1 and 2) are placed in the grooves of the core of the stator, but to achieve this goal, the thickness of the stator iron should vary from the teeth area 3 to the yoke area 4.

Figure 3:
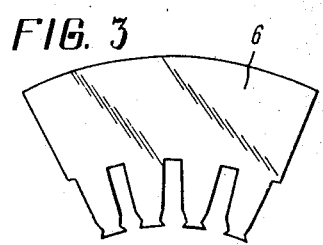
FIG. 3 shows an individual iron lamination segment of the stator shown in FIG. 1, having a teeth portion and a yoke portion.
Figure 4:
FIG. 4 shows another individual iron lamination segment of the stator shown in FIG. 1, having no teeth portion.

Consequently, in accordance with the present invention, the stack or pack of the laminations of the core 5 incorporates lamination segments 6 of the first kind shown in FIG. 3 within the limits of the axial thickness of the teeth area, and also lamination segments 7 of the second kind shown in FIG. 4, which are added to the stack to build up the axial thickness of the latter to a desired extent in the yoke area 4.

Figure 2:
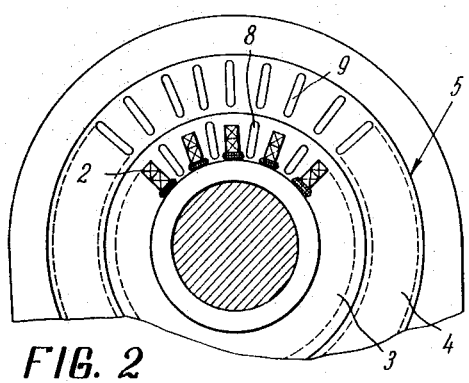
FIG. 2 is a cross-sectional view taken along line A—A of Fig. 1.
Figures 5, 6:
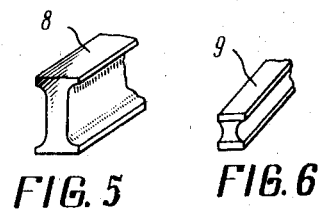
FIG. 5 shows a ventilation spacer positioned in the teeth area of the stator shown in FIGS. 1 and 2.
FIG. 6 shows a ventilation spacer positioned in the yoke area of the stator shown in FIGS. 1 and 2.

Ventilation spacers positioned in the radial ventilating ducts 1 (FIG. 1) of the stator are also of two kinds; spacers of the first kind 8 (FIG. 5) are positioned in the teeth area 3 (FIGS. 1 and 2), while spacers of the second kind 9 (FIG. 6) are placed in the yoke area 4 (FIGS. 1 and 2). The ventilation spacers 9 have their dimension in the axial direction of the machine less than that of the spacers 8 by the extent of variation in the axial thickness of the stack of the stator iron in the yoke area 4 and in the teeth area 3, to provide for the varying axial extent of the ventilating ducts 1, respectively, in teeth area 3, where this extent is greater, and in the yoke area 4 of stator core, where this extent is smaller.

The above described structure of the stator core does not increase the aerodynamic resistance to the flow of the coolant in an electrical machine, as compared with similar machines of the prior art, because in such machines the major components of the aerodynamic resistance are the resistance to the access of the air into the ventilating ducts and the aerodynamic resistance of the gap between the stator and the rotor, which components are in no way affected by the present invention. Consequently, the rate of flow of the coolant through the machine is the same. Moreover, the speed of the cooling fluid in the stator yoke area is even somewhat increased, owing to the reduction of the cross-sectional dimension of the ventilating duct in the yoke area, which feature additionally improves the stator cooling conditions.

Besides, the effective length of the stator iron in the yoke area is increased in the structure, embodying the present invention, whereby the machine can have a greater magnetic flux and, as compared with similar machines of the prior art, can have greater capacity, while being of the same size, or, alternatively, can be of a smaller size, while being of the same capacity.

What is claimed is:
1. A stator for an electrical machine comprising a core including a stack of laminations and having a yoke area and a teeth area and provided with a plurality of ventilating ducts each having a portion in said yoke area and a portion in said teeth area, said portions of said ventilating ducts in said teeth area having a greater dimension in the axial direction of said stator than said portions of said ducts in said yoke area, said core being provided with grooves, and winding turns in the grooves of said core, the said ducts each having a cross-sectional flow-passage area which is substantially equal throughout.

2. A stator, as set forth in claim 1, comprising lamination segments in the stack of the laminations of said core in said yoke area to provide said flow-passage area.

References Cited

UNITED STATES PATENTS 1,608,256  11/1926  Suter _____ 310—64 X
1,927,890  9/1933  Fechheimer _____ 310—64 X DONOVAN F. DUGGAN, Primary Examiner U.S. Cl. X.R.
310—216, 254